Oct. 15, 1929.        R. E. WILSON        1,731,479
ART OF DISTILLING HYDROCARBON OILS
Filed Jan. 15, 1925        3 Sheets-Sheet 1
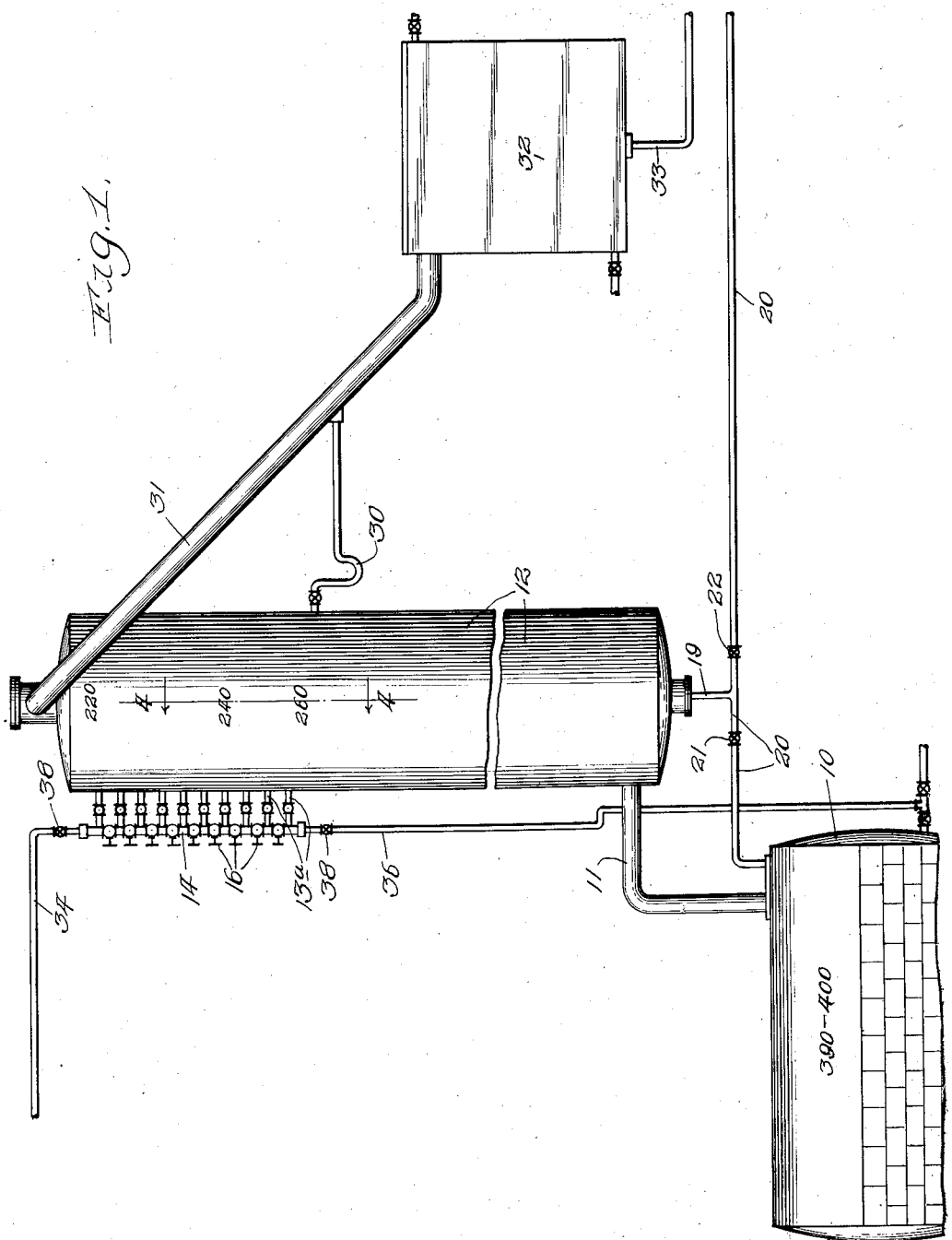

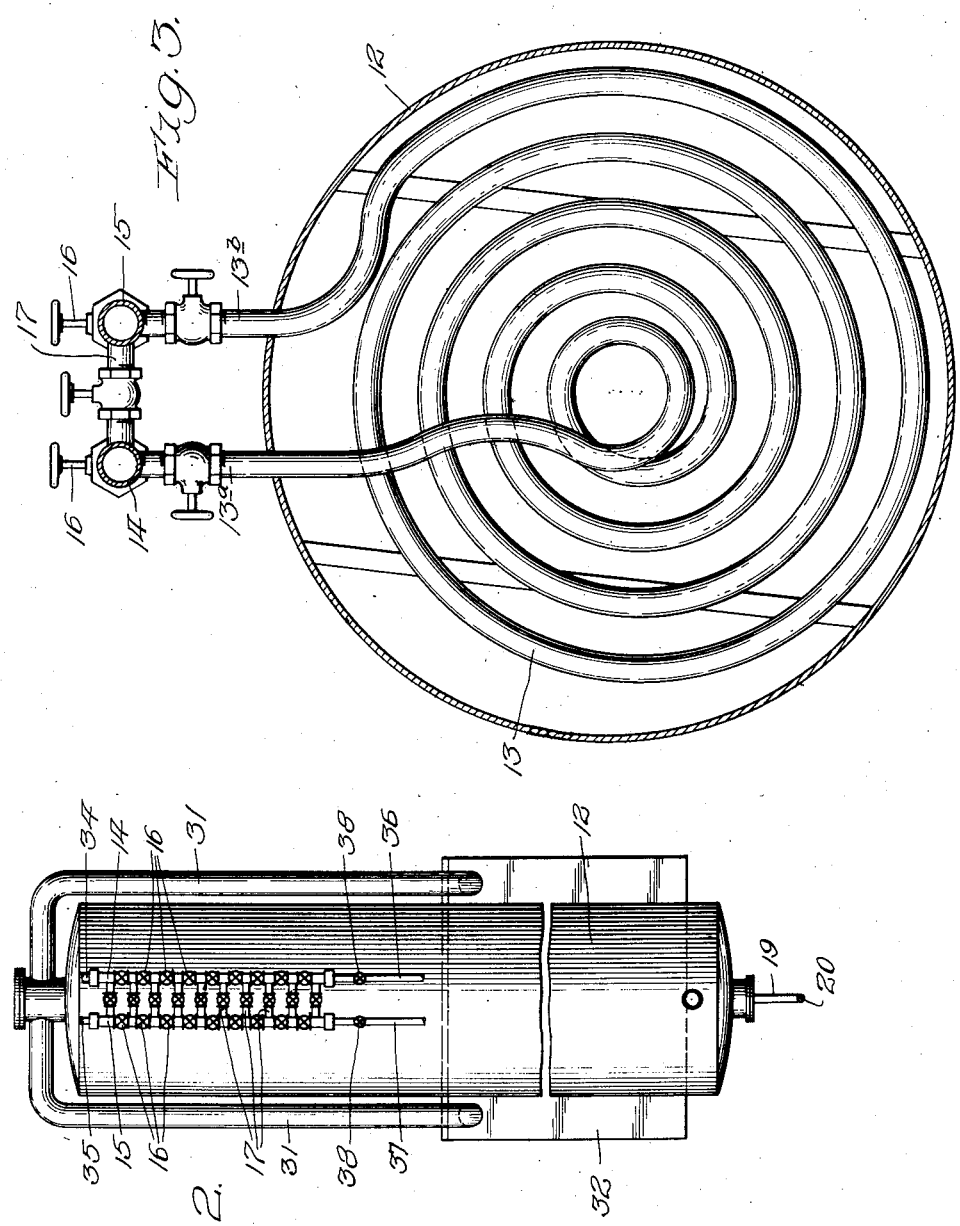

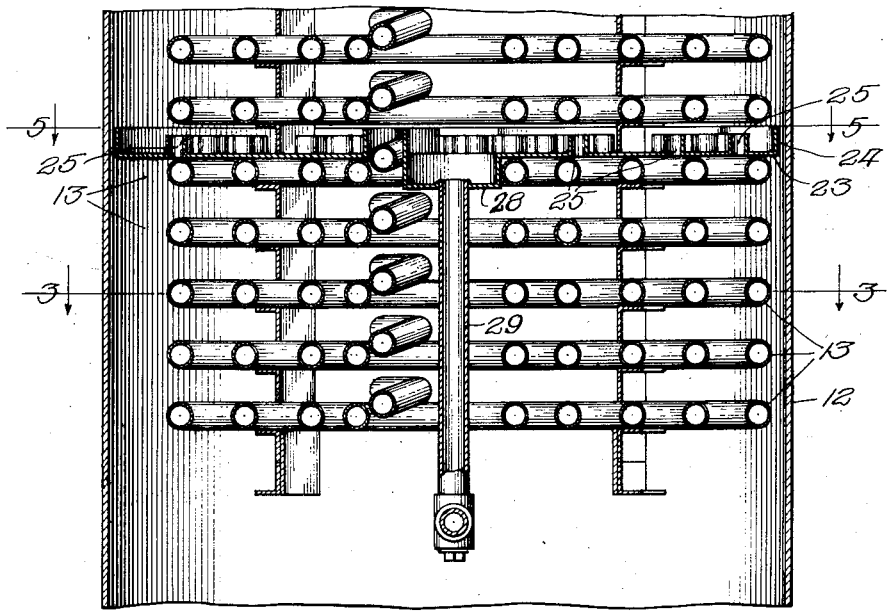
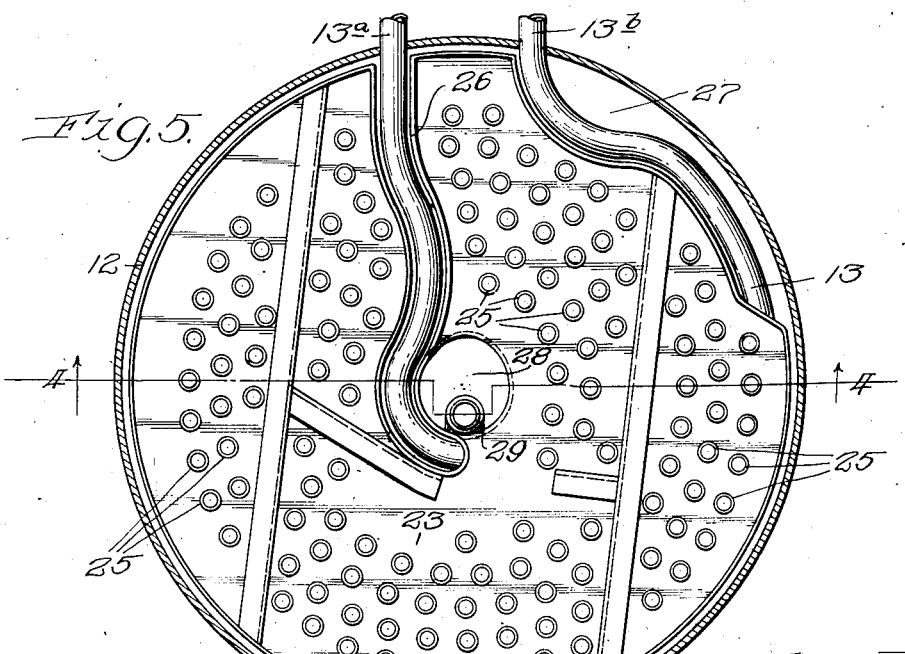

Patented Oct. 15, 1929

1,731,479

UNITED STATES PATENT OFFICE

ROBERT E. WILSON, OF CHICAGO, ILLINOIS, ASSIGNOR TO STANDARD OIL COMPANY, OF WHITING, INDIANA, A CORPORATION OF INDIANA

ART OF DISTILLING HYDROCARBON OILS

Application filed January 15, 1925. Serial No. 2,532.

The present invention relates to improvements in the art of distilling hydrocarbon oils, and will be fully understood from the following description, illustrated by the accompanying drawings, in which:

Figure 1 is a diagrammatic view of apparatus suitable for carrying the invention into effect;

Fig. 2 is a side elevation of the fractionating column shown in Fig. 1;

Fig. 3 is a horizontal sectional view through the column on the line 3—3 of Fig. 4;

Fig. 4 is a vertical detail sectional view through the column on the line 4—4 of Figs. 1 and 5; and Fig. 5 is a horizontal sectional view through the tower on the line 5—5 of Fig. 4.

Referring more particularly to the drawings, the numeral 10 indicates a heated still, from which a vapor line 11 leads to a fractionating column 12, containing fractionating plates of any suitable or standard type. In the upper portion of the tower 12 there are provided a number of cooling coils, suitably of the flat or pancake type, these coils being indicated by the numeral 13. Both ends of each coil extend outside of the shell of the tower 12, as indicated at 13$^a$ and 13$^b$, and connect respectively with the manifolds 14 and 15. Valves 16 are provided in each of the manifolds 14 and 15 between the points of connection therewith of the ends 13$^a$ and 13$^b$ of adjacent coils 13. Valved connections 17 are provided between the manifolds 14 and 15 so that a cooling medium may be passed through the coils in series, in parallel or in multiple.

From the bottom of the tower 12 a line 19 leads reflux condensate to a line 20, one end of which leads into the still 10 and the other end to a receiving house (not shown) or any desired apparatus. Valves 21 and 22 are provided in the line 20 on each side of the connection with the line 19, so that the reflux condensate from the bottom of the tower 12 may be conducted in whichever direction may be found desirable at the time.

In the column, at a suitable intermediate point in the portion in which the coils 13 are provided, a substantially horizontal pan 23 is mounted between two of the coils. The diameter of this pan is sufficient to cause it to receive practically all of the reflux descending from the coils located above it. The outer margins of the pan 23 are upturned as at 24, to permit the collection of reflux therein. Openings are provided in the pan as at 26 and 27 for the passage of the ends of the coils, the margins of the pans being upturned around these openings also. A plurality of nipples 25 project upwardly from the bottom of the pan 23, permitting a substantially free passage of vapors from below the pan to the portion of the column above it. The upper level of these nipples is somewhat below the level of the margins 24 of the pan 23. At an approximately central position in the pan 23 a depression 28 is provided, in which a pool of reflux condensate may collect. A pipe 29 leads liquid from this pool to the exterior of the column, being provided outside of the column with a trap 30. At its outer end, the pipe 29 connects with vapor line 31 leading from the top of the tower 12 to the condenser 32. Reflux and condensate pass together through the condenser 32 and the resulting final condensate passes out through the line 33 to any suitable receiving device (not shown). Lines 34 and 35 are provided leading to the upper ends of the manifolds 14 and 15 respectively, and lines 36 and 37 are provided leading from the lower ends thereof. Each of these lines is controlled by suitable valves 38. Any selected one of these lines may be used as an intake to the coils, and any other as an outlet, according to the manner in which the oil is caused to flow through the coils 13.

In the form shown, by way of illustration, if the several coils are used in series, the hydrocarbon oil used as a cooling medium enters by way of the pipe 34, and makes its exit through the pipe 36. The latter leads the oil, for example, to the still 10, the oil being suitably passed through a tar exchanger or other suitable heat exchanger, if desired, before entering the still.

In the operation of the system, the oil in the still 10 is brought to vaporizing temperature under the prevailing pressure, which may suitably be atmospheric pressure and the vapors rising therefrom pass through the pipe 11 into the column 12. The vapors rise through the column 12 in countercurrent to the descending reflux, encountering the coils 13 in the upper portion of the column. The coils 13, and the passage of hydrocarbon oil to be distilled therethrough are so controlled as to cool the vapors materially below the temperature at which they have the composition of the desired condensate. The collecting pan 23 is inserted in the column between two adjacent coils at approximately the point where the prevailing temperature is such that the vapor has approximately the composition of the desired product. For example, in the continuous distillation of crude or of rerun stock, the still 10 may be the first still of a battery, operating at 390 to 400° F. The temperature at the vapor outlet from the tower may be 220° F. and that in the tower at the lowermost coil 13 may be about 260° F., and that at the pan 23 about 240° F. Condensate formed below the pan 23 descends through the lower portion of the column 12 in countercurrent to the rising vapors forming a reflux condensate which passes out through the line 19 into the line 20, being conducted either into the still 10 from which the vapors arose, or to suitable receiving apparatus, in which the reflux is collected as a distillate product. Condensates formed by the additional cooling effect of the coils above the pan 23 are substantially entirely collected in the pan and removed through the line 29, while uncondensed vapors pass out through the lines 31. The condensate collected by the pan 23, and led out of the tower by the line 29, enters one of the vapor lines 31, and passes with the uncondensed vapors to the condenser 32 and the line 33 which leads to a suitable receiver. Thus the entire mass of vapors which rises above the pan 23 is directed to the condenser 32, either in the form of condensate or uncondensed vapors. A much larger proportion of the sensible and latent heat of the vapors may thus be made available for preheating the oil to be distilled which passes as a cooling medium through the coils 13, than is possible in apparatus hitherto available for the purpose.

I claim:

1. In a distilling apparatus, a fractionating column, a plurality of closed conduits therein, a collecting pan in said column intermediate of said conduits, means for withdrawing condensate from said pan to the exterior of the column, a pair of manifolds to which said conduits are connected in parallel, and valves on said conduits for controlling the flow of cooling medium therethrough.

2. In a distilling apparatus, a fractionating column, a plurality of closed conduits therein, a collecting pan in said column intermediate of said conduits, means for withdrawing condensate from said pan to the exterior of the column, a pair of manifolds to which said conduits are connected in parallel, valves on said conduits for controlling the flow of cooling medium therethrough, and valves on said manifolds between the connections of said conduits thereto whereby cooling medium may be caused to flow through said conduits in series, parallel and multiple.

3. In a distilling apparatus, a fractionating column, a plurality of closed conduits therein, a collecting pan in said column intermediate of said conduits, means for withdrawing condensate from said pan to the exterior of the column, a pair of manifolds to which said conduits are connected in parallel, valves on said conduits for controlling the flow of cooling medium therethrough, valves on said manifolds between the connections of said conduits thereto, and valved bypasses between said manifolds in parallel with said conduits.

4. In a distilling apparatus, a fractionating column, a plurality of closed conduits therein, a collecting pan in said column intermediate of said conduits, means for supplying oil to said conduits, means for conveying oil from said conduits to a still, means for distributing the oil in regulable proportion between the conduits above said pan and the conduits below said pan, and means for withdrawing condensate collecting in said pan to the exterior of the column.

5. In combination, a still, a fractionating column, a vapor line therebetween, an outlet for vapors from said column, a plurality of closed conduits in the upper part of said column, a collecting pan intermediate of said conduits, means for supplying oil to said conduits, means for conveying oil from said conduits to said still, valves for controlling the flow of oil through said conduits whereby the amount of vapors condensed above and below said pan may be regulated, and means for conveying condensate from said pan to the vapors passing through said outlet.

ROBERT E. WILSON.